Figure 1:
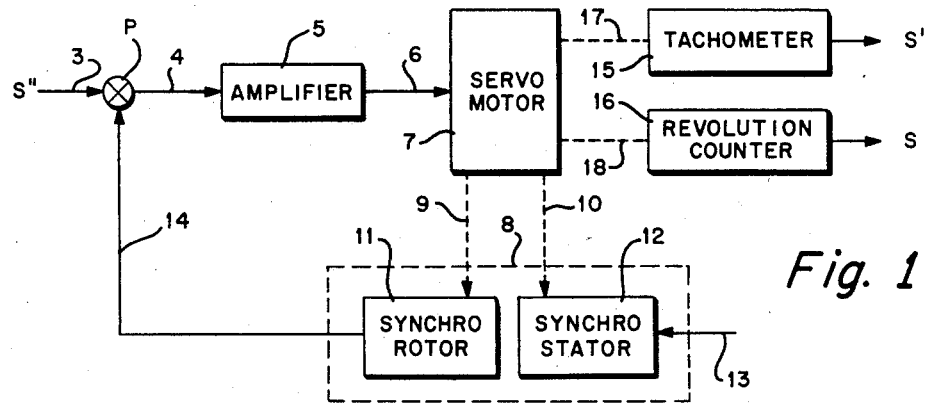

Nov. 17, 1959  S. J. RUSK  2,913,180
COMBINATION INTEGRATOR
Filed June 10, 1955

INVENTOR.
STANLEY J. RUSK
BY
ATTORNEYS

United States Patent Office 2,913,180
Patented Nov. 17, 1959

2,913,180

COMBINATION INTEGRATOR

Stanley J. Rusk, Hatboro, Pa.

Application June 10, 1955, Serial No. 514,798

7 Claims. (Cl. 235—183)

(Granted under Title 35, U.S. Code (1952), sec. 266)

The invention described herein may be manufactured and used by or for the Government of the United States of America for governmental purposes without the payment of any royalties thereon or therefor.

The present invention relates to a combination integrator and more particularly to an integrator comprising a precision torsion spring, the rod twist of which is utilized to produce a signal which is used with an input signal to be integrated.

There are many electronic, electro-mechanical, mechanical, thermal, and hydraulic mechanisms which are able to perform the integration function. However, each of the above mechanisms has certain defects, examples of these being complexity of design, poor drift immunity, inconvenient form of input and output, and large volume and weight.

The present invention overcomes the above defects and adds to the convenience by providing two useful outputs. The invention consists of a servo-loop which is utilized with a signal as the input to be integrated. This signal is mixed with a synchro produced signal to produce an error signal approaching zero which is highly amplified for driving the servo motor of the loop. The motor is connected to and drives the rotor of the synchro, the former of which is connected to a heavy weighted stator through a torsion spring member. The torsion spring and stator together constitute a torsion spring suspended mass, the angle of twist of which measures the unbalanced torque applied to the system. By the relation, torque=moment of inertia×angular acceleration, it is apparent that the output of the synchro, approaching the value of the input signal to be integrated, is an accurate measure of the changes in movement of the servo motor. A tachometer and revolution counter connected to the servo motor indicate directly the first and second integrals, respectively, of the input signal.

The accuracy of this device depends on the torsion rod twist angle which can be obtained precisely, and the limit of the system is essentially dictated by the precision of the torsion rod and the mass. The torsion spring mass is suspended and with this suspension there is negligible coulomb friction in the sensitive portion of the system for small accelerations of the carrying vehicle, and less than the friction of systems supported entirely by bearings for large vehicle accelerations. The torsion spring is selected for the particular application to provide the best compromise between instrument size and immunity to vertical acceleration. When the outputs are large compared with the input, which is usual for integration functions in physical systems, the outputs of this arrangement may be taken off the servo shaft instead of the synchro stator, so that the indicators are external to, and do not load the sensitive portion of the instrument. Therefore, this system has the advantage of two useful outputs, simplicity of design, fair drift immunity, convenient form of input and output, small volume and weight, and inherent accuracy. The use as described of the spring, mass, and servo system to obtain first and second integrals is believed to be new.

An object of the present invention is the provision of a servo loop arrangement for performing integrations.

Another object is to provide an arrangement for performing integrations involving the use of a precision torsion spring suspended mass in connection with a servo system.

A further object of the invention is to provide a simplified arrangement for providing first and second integrals which are taken off as two useful outputs simultaneously and which do not load the sensitive portion of the instrument.

Still another object of this invention is to provide a simplified arrangement for performing integrations of inherent accuracy, simplicity of design, and of small volume and weight.

A final object of the present invention is the provision of a synchro consisting of a rotor and a stator connected therebetween by a torsion rod, the twist of which produces a signal which is useful in making integration determinations.

Figure 2:
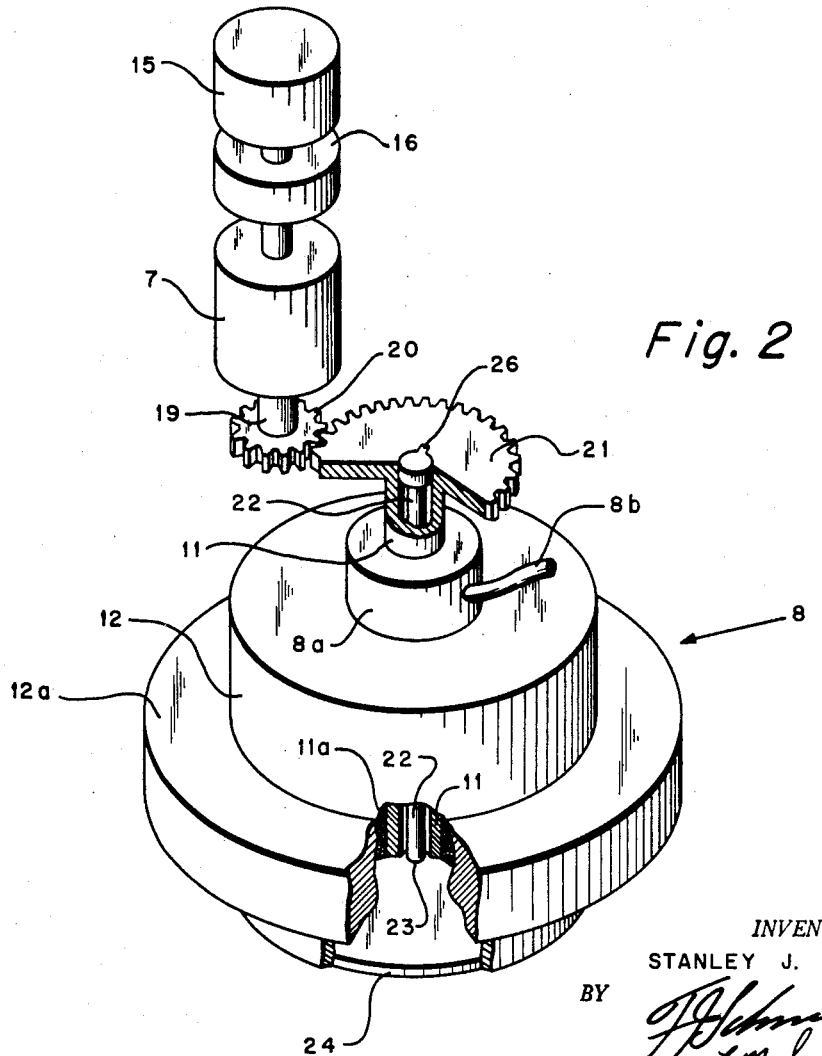

The exact nature of this invention as well as other objects and advantages thereof will be readily apparent from consideration of the following specification relating to the annexed drawing in which:

Fig. 1 shows a servo system for producing the first and second integrations of an input signal embodying the instant invention; and Fig. 2 shows the details of the synchro component of the servo system of Fig. 1.

Referring now to the drawings, wherein like reference characters designate like or corresponding parts throughout the several views, there is shown in Fig. 1, which illustrates a preferred embodiment, a servo loop with an input signal S" and output signals S' and S. S' and S are the first and second integrals, respectively, of the input signal S". Broken lines in Fig. 1 indicate mechanical connections and solid lines indicate electrical connections.

The input signal S" is supplied by lead 3, and the error signal passes by lead 4 to a high gain amplifier 5 where it is amplified and passed by lead 6 to servo motor 7. Servo motor 7 drives synchro 8 (shown in phantom) directly (and shown graphically) by line 9 to rotor 11 and through a torsion spring 10 to synchro stator 12 of synchro 8. This is described below in greater detail. Excitation of stator 12 is provided by lead-in 13 and the output signal of synchro 8 is delivered by lead 14 from rotor 11 to point P where the input signal S" is compared with the synchro signal to produce the error signal delivered to amplifier 5. The signal at 4 represents the error signal approaching zero which the servo motor 7 tends to null at point P by the rotation of synchro 8. Tachometer 15 and revolution counter 16 are mechanically coupled by lines 17 and 18, respectively, to servo motor 7 and the outputs are shown on these devices.

Referring to Fig. 2, there is seen the arrangement of servo motor 7, tachometer 15, revolution counter 16 and synchro 8 consisting of stator 12 and rotor 11. Servo motor 7 drives synchro 8 through shaft 19, gear 20, and gear 21, the latter of which is both integral with synchro rotor 11 and connected to synchro stator 12 through the torsion rod 22. Torsion rod 22 is connected at its bottom end 23 to the end face 24 of stator 12 and at the top end is keyed at 26 to gear 21. Rotor 11 is provided with the usual coils 11a.

It is seen that synchro 8 is constructed of a stator 12 and a rotor 11 which are free to rotate independently of each other except that they are each mechanically connected to be driven by motor 7. Rotor 11 is rigid with gear 21 driven by motor 7, but stator 12 is connected to motor 7 through a flexible connection which is the torsion rod 22. As servo motor 7 accelerates synchro 8, for example, it is apparent that rotor 11 will maintain its position with respect to motor 7 because of the rigid connection. Stator 12, however, being weighted and flexibly connected to motor 7, will lag behind motor 7 because of inertia and causing rod 22 to twist. This action will, of course, bring about an angle between the coils of rotor 11 and the coils of stator 12, for reasons hereinafter explained.

The circumferential portion 12a added to synchro stator 12 adds moment of inertia to synchro stator 12. Either rotor 11 or stator 12, being conventional synchro coils, may be excited as primary, although, for purposes of illustration, stator 12 is shown as undergoing the excitation. The necessary commutator rings are located within casing 8a, having lead-in 8b for enclosing the input and output connections. The magnitude of the signal transferred between the stator and rotor of the synchro is proportional to the cosine of the angle of relative angular displacement of the rotor 11 with respect to stator 12, as is well understood in the art.

The combination of torsion bar 22 with the synchro stator 12 forms a precision torsion spring suspended mass, which performs the actual integration. The relationship employed is torque=moment of inertia×angular acceleration. The net signal produced at lead 14 is a reflection of the twist in rod 22 which is caused by the angular acceleration of the synchro device, and which acceleration is absorbed in the torsion spring mass as a twist angle. The value of the rod twist signal at lead 14 approaches in value the input signal value S″ since the error signal at lead 4 approaching zero is highly amplified and fed to drive synchro 8.

The combination integrator functions as follows: A signal S″ whose frequency content is low compared with the instrument capability is inserted. A feedback signal 14 proportional to the twist of rod 22 is subtracted from the input signal S″, and the difference is amplified and applied to motor 7 to drive it and the attached synchro rotor 11 in the direction required to zero the error signal 4. When the latter is nulled, it equals S″. Because the amplifier gain is high and the servo is relatively lively, the error signal happens to be close to zero at all times, and is essentially equal to S″ at all times. Now, since signal 4 is proportional to the rod twist, the rod twist is proportional to S″. The torque applied to mass 12a and stator 12 is proportional to the rod twist. It follows that the torque applied to, and the corresponding acceleration of, the stator and mass are proportional to S″. Hence, the integral of the stator acceleration, the stator velocity, is proportional to the integral of S″; and the signal integral of the stator acceleration, the stator displacement, is proportional to the second integral of S″.

It will be noted that with this suspension there is negligible coulomb friction in the sensitive portion of the system for small environmental accelerations, the friction of this system being less than the friction of systems supported and carried by bearings for large accelerations. The torsion spring is selected for the particular application to provide the best compromise between instrument size and immunity to vertical acceleration. A two speed synchro or similar multiplying system can be applied without subjecting the spring or mass to extraneous torques beyond those existing in the simplest arrangement. Hence, the torsion rod twist angle can be obtained accurately, and the accuracy limit of the system is essentially dictated by the precision of the torsion rod and the mass.

As it has already become evident, the above described system and arrangement lends itself to a wide variety of uses, especially since both the first and the second integrals may be taken off the servo shaft simultaneously. The arrangement of this device is basically reliable and rugged, and is inherently accurate because of the mechanical structure of the synchro device and the simplicity of design.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. An arrangement for integrating a first signal comprising a servo loop having a servo motor, a synchro consisting of a stator and a rotor mechanically coupled together through a torsion spring, the twist of which is indicative of torque applied thereto and driven by said servo motor for producing a feedback signal which is proportional to said torque in said synchro, means to compare said first signal with said feedback signal to produce an error signal approaching zero, high gain amplifier means for amplifying said error signal for driving said servo motor, and tachometer means driven by said servo motor for indicating an integral of said first signal.

2. In a synchro, an assembly consisting of an outer stator casing and a rotor located within and concentric to said stator, said rotor being generally cylindrical, a rod extending through said rotor along the latter's cylindrical axis and connected to said rotor only at one end and connected at the other end to said stator casing, means for supplying electrical input to said synchro, and means for withdrawing from said synchro an electric output which is proportional to the unbalanced torque supplied to said synchro.

3. In a synchro, an assembly consisting of an outer stator casing and a rotor located within and concentric to said stator, said rotor being generally cylindrical, a rod extending through said rotor along the latter's cylinder axis and connected to said rotor only at one end and connected at the other end to said stator casing, means mechanically coupled to said synchro stator for rotating said synchro, means for supplying electrical input to said synchro, and means for withdrawing from said synchro an electric output which is proportional to the unbalanced torque supplied to said synchro from said mechanically coupled means.

4. In a synchro, an assembly consisting of an outer stator casing and a rotor located within and concentric to said stator, said rotor being generally cylindrical, a torsion spring extending through said rotor along the latter's cylinder axis and connected to said rotor only at one end and connected at the other end to said stator casing, the angle of twist of which measures an unbalanced torque applied to said spring, means mechanically coupled to said synchro stator for rotating said synchro, means for supplying electrical input to said synchro, and means for withdrawing from said synchro an electric output which is proportional to the unbalanced torque supplied to said synchro from said mechanically coupled means.

5. A synchro transformer consisting of a cylindrical stator having a concentric cylindrical cavity, a hollow sleeve connected to one end of said stator and extending therefrom, a hollow rotor of generally cylindrical shape located within said stator and having a hollow extended portion passing through said hollow sleeve, means comprising a flexible connection between said stator and said rotor for maintaining said stator and said rotor in such relation that when said flexible connection is free of distortion inducing forces there will be negligible inductive coupling between said stator and said rotor.

6. A synchro transformer consisting of a generally cylindrical stator having a concentric cylindrical cavity, a hollow sleeve connected to one end of said stator and extending therefrom, a hollow rotor of generally cylindrical shape located within said stator and having a hollow extended portion passing through said hollow sleeve, means comprising a torsion spring passing through said rotor forming a connection between said stator and said rotor for maintaining said stator and said rotor in such relation that when said torsion spring is free of distortion inducing forces there will be negligible inductive coupling between said stator and said rotor.

7. A synchro transformer consisting of a stator having a concentric cavity, an end face, and a hollow sleeve connected to the other end of said stator and extending therefrom, a hollow rotor located within said stator and having hollow extended portion passing through said hollow sleeve, torsion spring means passing through said rotor and rigidly connected at one end to the outer end of the extended portion of said rotor and at its other end to the stator and face, the said torsion spring supporting said rotor and stator in such relation that the degree of inductive coupling therebetween at any instant is proportional to the angle of twist of said torsion spring at said instant.

References Cited in the file of this patent

UNITED STATES PATENTS 2,465,624     Agins                  Mar. 29, 1949

OTHER REFERENCES

Servomechanism Practice (Ahrendt), published by McGraw-Hill Book Co., New York, 1954, pages 46 and 47.